United States Patent
Gooch et al.

(10) Patent No.: US 9,521,079 B2
(45) Date of Patent: Dec. 13, 2016

(54) PACKET FORWARDING BETWEEN PACKET FORWARDING ELEMENTS IN A NETWORK DEVICE

(71) Applicant: HEWLETT-PACKARD DEVELOPMENT COMPANY, L.P., Fort Collins, CO (US)

(72) Inventors: Mark Gooch, Roseville, CA (US); Thomas A. Keaveny, Auburn, CA (US); Nandakumar Natarajan, Gold River, CA (US); Bruce E. LaVigne, Roseville, CA (US)

(73) Assignee: HEWLETT PACKARD ENTERPRISE DEVELOPMENT LP, Houston, TX (US)

( * ) Notice: Subject to any disclaimer, the term of this patent is extended or adjusted under 35 U.S.C. 154(b) by 630 days.

(21) Appl. No.: 13/625,530

(22) Filed: Sep. 24, 2012

(65) Prior Publication Data

US 2014/0086255 A1  Mar. 27, 2014

(51) Int. Cl.
*H04L 12/56* (2006.01)
*H04L 12/801* (2013.01)
*H04L 12/851* (2013.01)
*H04L 12/725* (2013.01)

(52) U.S. Cl.
CPC .............. *H04L 47/17* (2013.01); *H04L 45/30* (2013.01); *H04L 47/2441* (2013.01)

(58) Field of Classification Search
CPC .. H04L 41/0803; H04L 47/12; H04L 12/1886; H04L 47/10; H04L 47/17; H04L 47/2441; H04L 45/30
See application file for complete search history.

(56) References Cited

U.S. PATENT DOCUMENTS

| | | | |
|---|---|---|---|
| 5,777,987 A * | 7/1998 | Adams et al. | 370/336 |
| 7,103,045 B2 | 9/2006 | Lavigne et al. | |
| 7,242,690 B2 | 7/2007 | LaVigne et al. | |
| 7,570,640 B2 | 8/2009 | LaVigne et al. | |

(Continued)

OTHER PUBLICATIONS

Freescale Semiconductor, Introducing Freescale's QUICC Engine™ Technology, 2007, 4 pages.

(Continued)

*Primary Examiner* — Khaled Kassim
*Assistant Examiner* — Zhaohui Yang
(74) *Attorney, Agent, or Firm* — Hewlett Packard Enterprise Patent Department (57) ABSTRACT

A network device having a plurality of packet forwarding elements, each including a hardware component for receiving and forwarding data packets from and to other network devices via a plurality of input ports connected to a network. Each hardware component is configured to determine whether a received data packet is one of a predetermined class of data packets based on data in the received data packet and, if so, generate expedited processing instructions corresponding to the received data packet based on data in the received data packet. The hardware component forwards the received data packet, together with the corresponding expedited processing instructions, directly to the hardware component of all packet forwarding elements of the plurality of packet forwarding elements for processing based on the expedited processing instructions.

21 Claims, 6 Drawing Sheets

(56) References Cited

U.S. PATENT DOCUMENTS

| | | |
|---|---|---|
| 7,830,793 B2 | 11/2010 | Gai et al. |
| 7,903,655 B2 | 3/2011 | Gooch et al. |
| 2004/0196843 A1* | 10/2004 | Zinin .......................... 370/389 |
| 2005/0105560 A1* | 5/2005 | Mann et al. .................. 370/503 |
| 2007/0124495 A1* | 5/2007 | Sreejith ................ H04L 45/308 |
| | | 709/238 |
| 2007/0133584 A1* | 6/2007 | Youn et al. .................. 370/419 |
| 2007/0183416 A1* | 8/2007 | Gooch .................... H04L 45/30 |
| | | 370/389 |
| 2009/0213869 A1* | 8/2009 | Rajendran et al. ........... 370/420 |
| 2011/0185082 A1 | 7/2011 | Thompson |

OTHER PUBLICATIONS

Decasper et al., A Scalable, High Performance Active Network Node, Computer Engineering and Networks Laboratory, ETH Zurich; Applied Research Laboratory, Washington University, St. Louis, USA, Oct. 1998, 19 pages.

Ohlendorf et al., FlexPath NP—A Network Processor Concept with Application-Driven Flexible Processing Paths, Munich University of Technology, 2005, pp. 279-284.

* cited by examiner

PACKET FORWARDING BETWEEN PACKET FORWARDING ELEMENTS IN A NETWORK DEVICE

BACKGROUND

Computing networks can include any number of network devices such as routers, switches, hubs, servers, desktop PCs, laptops, and workstations, for example, and peripheral devices such as printers and scanners, for example, which are networked together across a local area network (LAN) and/or wide area network (WAN), for example. Information is transferred between computers within networks according to a communication protocol which defines rules and data format for exchanging information in the network. Information is transferred in the network in packets which include payload data packaged with a header containing information for the forwarding of the packet in the network, such as destination and origin information, protocol information, and error checking data, for example.

Forwarding of data packets, or packet forwarding, is carried out by routers, switches, and other network devices that employ some type of packet forwarding element or function that uses the header information to perform basic bridging, routing, ACL (Access Control List), and QoS (Quality of Service) lookup functions for determining how to forward the data packet. Often times, packet forwarding devices, such as routers and switches, for example, include multiple packet forwarding elements, such as multiple blades in a chassis switch configuration, and multiple switches connected in a stack configuration, for example.

As described above, it is commonplace in networks for packet forwarding decisions to be distributed across multiple forwarding devices in the network, such as multiple switches and routers, for example, and across multiple forwarding elements in the same device, such as multiple blades in switch or multiple switches in a stack, for example.

DETAILED DESCRIPTION

In the following detailed description, reference is made to the accompanying drawings which form a part hereof, and in which is shown by way of illustration specific embodiments in which the invention may be practiced. In this regard, directional terminology, such as "top," "bottom," "front," "back," "leading," "trailing," etc., is used with reference to the orientation of the Figure(s) being described. Because components of embodiments can be positioned in a number of different orientations, the directional terminology is used for purposes of illustration and is in no way limiting. It is to be understood that other embodiments may be utilized and structural or logical changes may be made without departing from the scope of the present invention. The following detailed description, therefore, is not to be taken in a limiting sense, and the scope of the present invention is defined by the appended claims. It is to be understood that features of the various embodiments described herein may be combined with each other, unless specifically noted otherwise.

Embodiments of the present disclosure provide a network device including a plurality of packet forwarding elements, each packet forwarding element including a hardware component for receiving and forwarding data packets from and to other network devices via a plurality of input ports when connected to a network. Each hardware component determines whether a received data packet is one of a predetermined class of data packets based on data in the received data packet and, if so, generates expedited processing instructions corresponding to the received data packet based on data in the received data packet. The hardware component then forwards the received data packet together with the corresponding expedited processing instructions directly to the hardware component of all packet forwarding elements of the plurality of packet forwarding elements for processing based on the expedited processing instructions.

According to one embodiment, the predetermined class of data packets includes data packets that should have timely distribution to all packet forwarding elements of the network device, such as certain protocol messages that should have low-latency distribution to ensure that proper operation of a network of which the network device is a part is maintained. As described herein, by forwarding data packets identified as belonging to the predetermined class of data packets directly between hardware components of all packet forwarding elements of the network device, the involvement of CPUs can be reduced or eliminated, thus enabling such packets to be processed at or near hardware speed.

Figure 1:
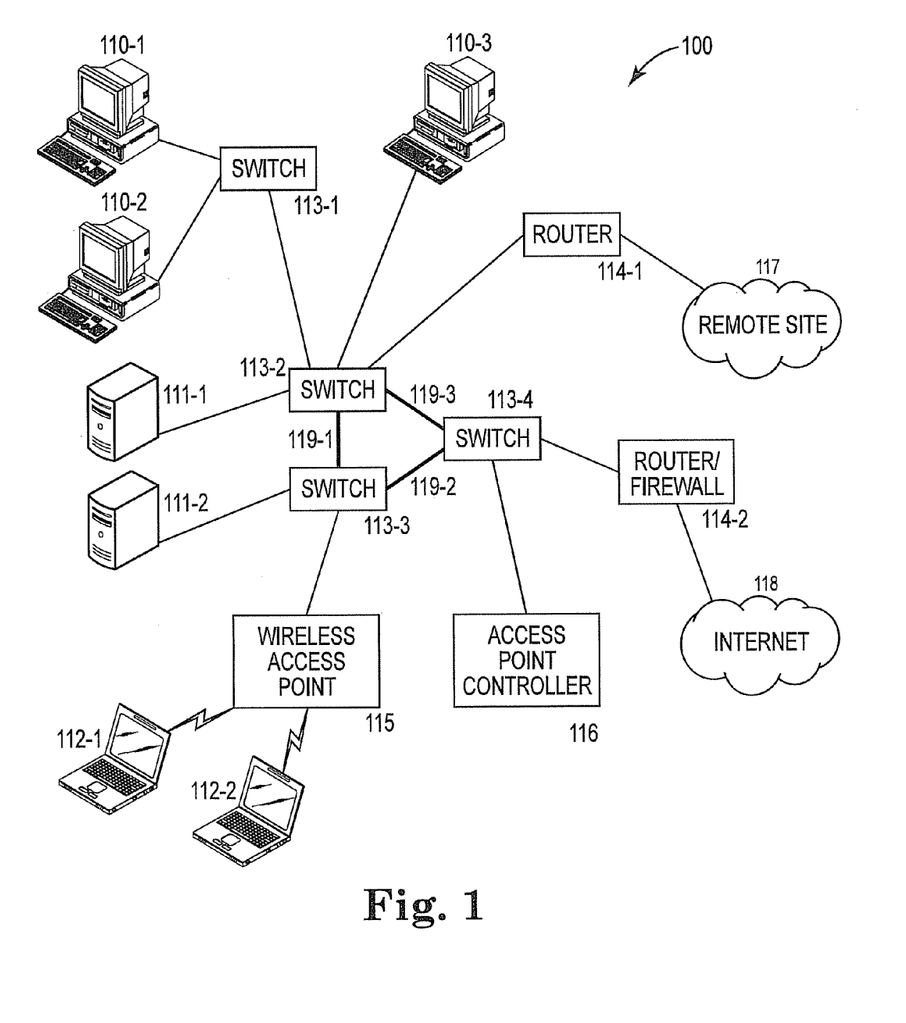
FIG. 1 is a schematic and block diagram illustrating an example of a computing device network in which a network device in accordance with the present disclosure can be implemented.

FIG. 1 is a schematic and block diagram illustrating an example of a computing device network 100 in which a network device employing low-latency packet forwarding between forwarding hardware components of packet forwarding elements, such as between blades of chassis-type switch packet forwarding engines, according to embodiments of the present disclosure, can be implemented. As illustrated in FIG. 1, a number of devices can be networked together in a local area network (LAN) and/or wide area network (WAN), for example, using routers, hubs, switches, and the like. As defined herein, a "network device" refers to any device having a processor and memory resources that is connected to a network, such as a switch, router, hub, server, PC, etc., as further illustrated and described below. Although a switch is primarily used herein to describe embodiments of the present disclosure, as will be understood by those of ordinary skill in the art, embodiments of the present disclosure can be implemented in any network device having packet forwarding functions.

As illustrated in FIG. 1, network 100 includes clients 110-1, 110-2, and 110-3, which can be desktop PCs, laptop computers, etc., servers 111-1 and 111-2, which can serve a variety of different functions such as print data servers, web servers, mail servers, print servers to handle print jobs for network 100, application servers, database servers, file servers, etc., and clients 112-1 and 112-2, which can be laptop computers, tablets, phones, handheld/mobile devices, etc., that are connected via wireless (e.g., IEEE 802.11 standard for wireless local area network (WLAN) communication) to wireless access point (WAP) 115.

The above described network devices are connected to one another and/or to other networks using network switches 113-1, 113-2, 113-3, and 113-4, and routers 114-1 and 114-2, with switch 113-4 being connected to Access Point Controller (APC) 116, which manages WAPs, such as WAP 115, router 114-1 connecting to a remote site 117, and router 114-2 connecting to the Internet 118, with router 114-2 also acting as a firewall in this instance. According to one embodiment, as will be described in greater detail below, switches 113-2, 113-3, and 113-4 are connected together as a "frontplane stack" (also known as simply a stack or virtual chassis) via links 119-1, 119-2, and 119-3.

Each network device in network 100 can be physically associated with a port of a switch to which it is connected, such as to a port of switches 113-1 to 113-4, with information being passed through network 100 in the form of data packets in accordance with communications protocols that define rules and data formats for exchanging information (e.g., RIP, PIM, PIM bidir). Data packets are passed through the network 100 by network devices, such as switches, routers, and other network devices using forwarding logic or elements that forward data packets from a transmitting network device to a destination network device based on header information in the data packet.

In switching and routing architectures, such as switches 113 and routers 114 in network 100 of FIG. 1, forwarding decisions are commonly distributed across multiple forwarding elements, such as across multiple blades in a chassis switch configuration and across multiple switches in a stack configuration, for example (each of which will be described in greater detail below). In such configurations, each of the forwarding elements typically includes a local central processing unit (CPU) used to program hardware through a set of device drivers, and the switch as a whole includes one, or more, master CPUs that oversee control of the entire chassis/stack.

While such architectures enable the multiple forwarding elements to be individually programmable, which provides flexibility and enables timely deployment of new functionality to customers, and also ensures that the multiple forwarding elements operate as a single device (such as through the maintenance of forwarding and routing tables, for example), conventional processes of communicating messages first to a master CPU and then to the slave CPUs of each forwarding element can result in latencies that are not always acceptable with certain types of messages associated with certain networking protocols for which a low-latency response is desired, for example, messages which should be distributed in low-latency fashion in order to maintain stable network operation.

For example, if a data packet received by one forwarding element of a switch is of a type to be globally distributed to all forwarding elements of the switch (e.g., certain protocol messages), typically, the slave CPU on the receiving element is first notified. The slave CPU then passes a message to a master CPU which determines what action to take, and then notifies the slave CPU on each of the forwarding elements. The slave CPUs, in turn, program hardware on their respective forwarding element based on information in the data packet. Such a communication process includes the software involvement of three separate CPUs (i.e., the slave CPU of the forwarding element initially receiving the packet, a master CPU, and the slave CPUs on all forwarding elements), which introduces latency into the response, especially if the CPUs are busy performing other functions.

As a concrete example, consider protocol messages being forwarded according to the PIM Bidir (Protocol Independent Multicast Bidirectional) protocol. According to such protocol, devices, such as routers 114, are elected as designated forwarders (DF) which are responsible for multicast routing of packets on a specified interface for a range of multicast groups. The PIM Bidir protocol employs "DF winner packets" to enable multicast routers to communicate such state. If two or more multicast routers believe they are the DF for a same interface and range of multicast groups, then a multicast routing loop will form, which is disastrous for the network. Thus, if a given router receives a DF winner packet from an adjacent router, it is important for the given router to identify the packet as such, determine whether the adjacent router is about to become the DF for a same interface and range of multicast groups for which the given router is already the DF and, if so, the given router should quickly communicate updates to all of its forwarding elements indicating that it is no longer the DF in order to prevent a network loop.

Figure 2:
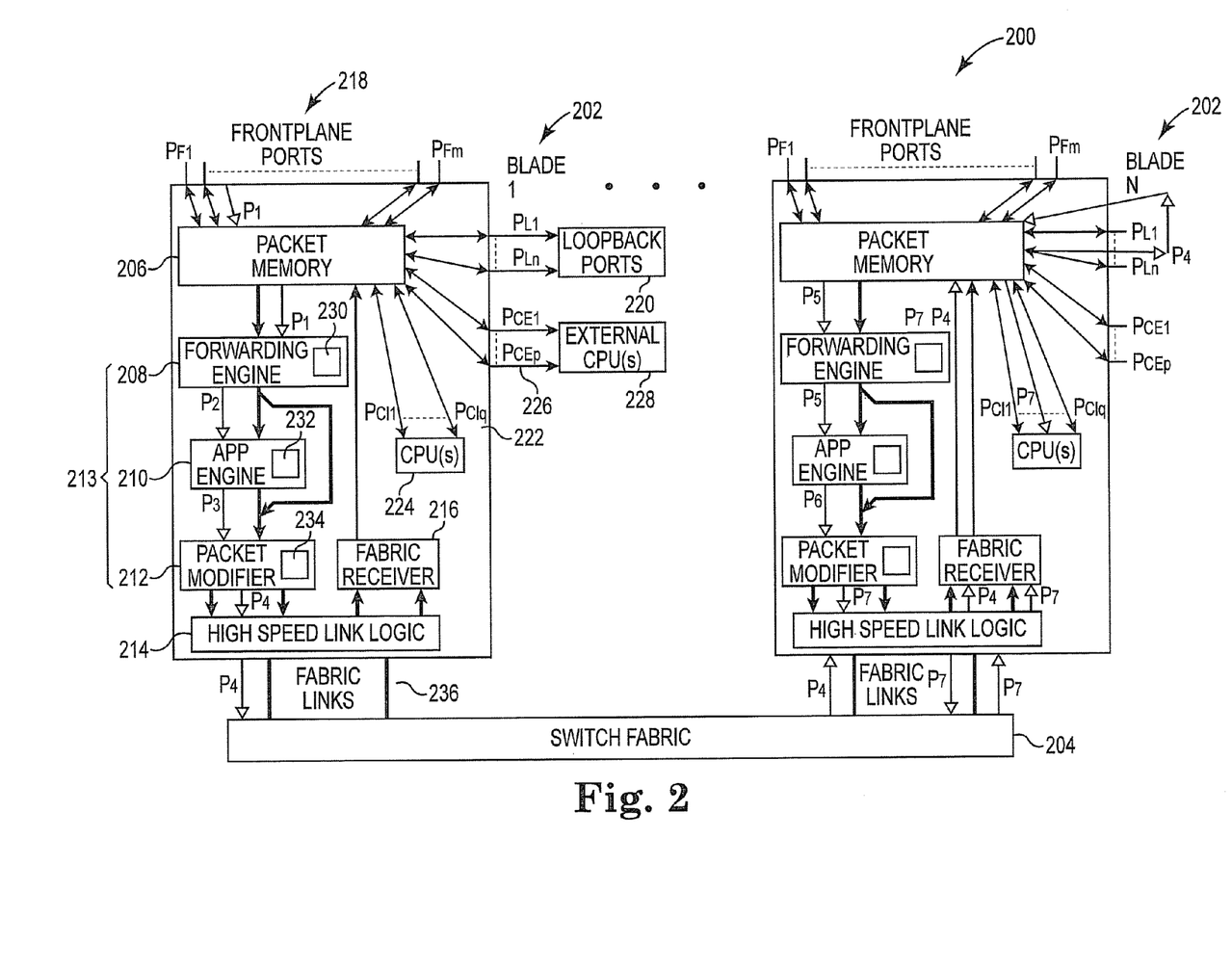
FIG. 2 is a block and schematic diagram illustrating a network switch in accordance with embodiments of the present disclosure.

FIG. 2 is a block and schematic diagram generally illustrating portions of a network switch 200 having a chassis switch architecture having multiple packet forwarding elements (e.g., blades) and employing packet forwarding between forwarding hardware logic or components of the multiple packet forwarding elements, according to embodiments of the present disclosure, in order to reduce and/or eliminate CPU involvement and thereby provide low-latency communication of packets identified as belonging to a predetermined class of data packets (e.g., packets to be globally distributed to all packet forwarding elements, such as protocol messages for proper network operation) to all packet forwarding elements of the switch.

Network switch 200 includes a plurality of packet forwarding elements, such as blades 202, with switch 200 illustrated as having blades $202_1$ through $202_N$, each connected with one another via a switch fabric 204. Each blade 202 includes a packet memory 206, a forwarding engine 208, an Advanced Packet Processor (APP) engine 210, a packet modifier 212, high-speed link logic 214, and a fabric receiver 216. Each blade 202 further includes a plurality of frontplane ports 218, indicated as ports $PF_1$ to $PF_m$, a plurality of loopback ports 220, indicated as ports $PL_1$ to $PL_n$, a plurality of internal CPU ports 222, indicated as ports $PCI_1$ to $PCI_q$, for connecting to one or more internal CPUs 224, one of which may be configured as a slave CPU 224 for blade 202, and a plurality of external CPU ports 226, indicated as port $PCE_1$ to $PCE_p$, for connection to external CPUs 228, wherein one of the external CPUs 228 may be configured as a master CPU 228 for network switch 200.

All ports 218, 220, 222, and 226 connect to blade 202 through packet memory 206, wherein portions of packet memory 206 (e.g., ranges of memory locations) are configured as buffers for frontplane ports 218, loopback ports 220, internal CPU ports 222, and external CPU ports 226, as well for forwarding engine 208. Frontplane ports 218 serve as ports from which customer traffic is received and transmitted via a network, such as network 100 of FIG. 1. Packets arriving from any of the ports, including upon ingress into switch 200 via frontplane ports 218, as well all those being sent to any ports, including before egress from switch via 200 via frontplane ports 218, are stored at buffer locations in packet memory 206.

Forwarding engine 208 is a programmable hardware component (i.e., programmable circuitry) which employs a number of programmable look-up tables 230 to determine how to forward a data packet, such as packet P1 (FIG. 2). Examples of programmable tables 230 associated with forwarding engine 208 include Layer 2 tables, such as MAC (Media Access Control) Address Tables, typically used for bridging packets (e.g., virtual local area network (VLAN), MAC address pairs); Layer 3 tables, such as IP (Internet Protocol) Address tables, used for a variety of functions such as IP DAs (Destination Addresses) to route IP packets (separate tables for IPv4 (Internet Protocol version 4) and IPv6 (Internet Protocol version 6), for example), to check IP SAs (Source Addresses) for security purposes, to look up IP Flows (e.g., IP DA, IP SA) for multicast routing purposes, and to look up IP Flows (e.g., IP DA, IP SA, IP Protocol, and TCP (Transmission Control Protocol)/UDP (User Datagram Protocol) source and destination ports) for security purposes; ACL (Access Control List) tables used for security functionality; and Quality of Service (QoS) tables used for prioritizing packets into different queues.

Forwarding engine 208 performs basic bridging, routing, ACL, and QoS lookup functions based on header information of a packet, such as packet P1, to determine and provide data forwarding decisions as to how and where the packet should be forwarded and as to how it should be modified. An example of a standard packet format, such as that of packet P1, is illustrated in greater detail below by FIG. 4. Forwarding engine 208 provides the information as to how and where the packet should be forwarded as well as to how the packet should be modified in a forwarding data structure which corresponds to the packet, as is described in greater detail below by FIG. 3.

APP engine 210 is a programmable hardware component (i.e., circuitry) which can be programmed using a microcoded language, and which is programmable to amend/override forwarding decisions made by the forwarding engine as to where to send the packet and how to amend the packet contents (e.g., by amending the forwarding data structure). As will be described in greater detail below, it is not necessary to involve APP engine 210 in every forwarding decision and, according to one embodiment, whether the APP engine 210 receives the packet for processing depends on the decisions made by forwarding engine 208 as indicated via the forwarding data structure. APP engine 210 also includes a plurality of programmable tables 232 for carrying out its functions, such as forwarding and state tables, for example.

Packet modifier 212 is a programmable hardware component (i.e., circuitry) which, as will be described in greater detail below, acts based on information in the forwarding data structure as received from either forwarding engine 208 or APP engine 210, to determine where to send the packet and to modify the packet as the packet is sent to high-speed link logic 214. According to one embodiment, packet modifier 212 includes a plurality of tables 234 which include sets of instructions for directing the operation of packet modifier 212, wherein data within the forwarding data structure act as pointers or indices to the entries in tables 234.

Although illustrated as being disposed within forwarding engine 208, APP engine 210, and packet modifier 212, programmable look-up tables 230, 232, and 234 can be stored at other locations accessible to forwarding engine 208, APP engine 210, and packet modifier 212. While all are programmable, in relative terms, APP engine 210 and packet modifier 212 may have higher programming capabilities as compared to forwarding engine 208, which is primarily a hard-coded component. Collectively, forwarding engine 208, APP engine 210, and packet modifier 212 are referred to herein as a forwarding hardware component 213 of packet forwarding element or blade 202.

High-speed link logic 214 is responsible for sending packets across switch fabric 204, via fabric links 236, to destination blades, such as blade N, for example. In one embodiment, even if the source blade and destination blade is the same blade for a given packet, the packet is still sent across switch fabric 204 by high-speed link logic 214.

Fabric receiver 216 receives packets from switch fabric 204 via fabric links 236 and high-speed link logic 214 and sends the packets to packet memory 206, from where the packets are sent out to the appropriate ports. As briefly described above, packet memory 206 is logically arranged such that there are a number of buffers for each group of egress ports 218, 220, 222, and 226, and such that if a packet is placed in a buffer for a particular port, it will ultimately be transmitted from packet memory 206 via that port. A packet may be placed in more than one buffer such that the packet can be transmitted from packet memory 206 via multiple ports (e.g., to send a same packet out of 5 ports, the packet is logically placed in the output buffers corresponding to 5 different egress ports, even though the packet may occupy only one space in packet memory 206).

According to one embodiment, each blade 202 comprises a chip, such as an Application Specific Integrated Circuit (ASIC). CPU(s) may be incorporated as part of the chip design (e.g., internal CPU(s) 222), or can be external to the chip (e.g., as part of a circuit board on which the chip is placed, shown as external CPU(s) 228), or some combination thereof. Regardless of their physical location, internal and external CPU(s) 224 and 228 are logically connected to internal CPU ports 222 and external CPU ports 226, respectively.

Figure 3:
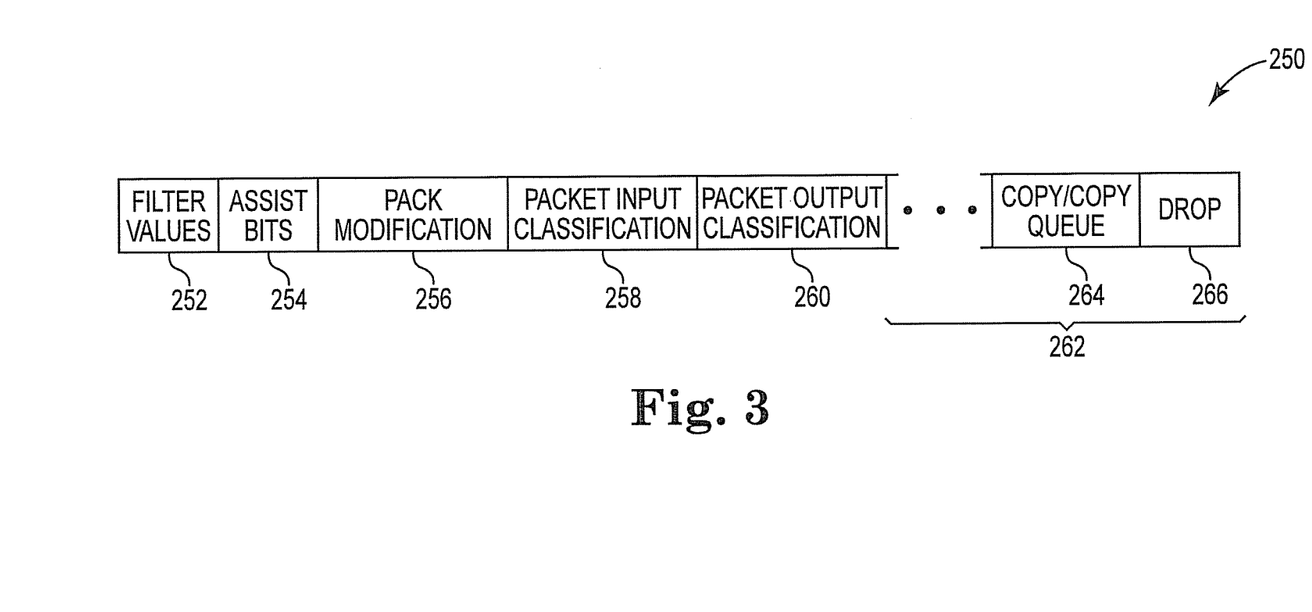
FIG. 3 is a block diagram illustrating an example of a forwarding data structure in accordance with embodiments of the present disclosure.

FIG. 3 generally illustrates an example of a forwarding data structure 250, according to one embodiment, as mentioned above with respect to forwarding engine 208, APP engine 210, and packet modifier 212. As illustrated, forwarding data structure 250 includes, among others, a filter values field 252, an assist bits field 254, a packet modification field 256, a packet input classification field 258, a packet output classification field 260, and various other fields 262, such as a copy/copy queue field 264, and a drop field 266.

Filter values field 252 includes values for filters which are used by fabric receiver 216 to determine where the packet is to be sent (e.g., to which ports 218, 220, 222, and 226). Assist bits field 254 includes bits, the value of which (e.g., whether or not individual bits are set) indicate whether or not the packet is to be sent to APP engine 210 and, if so, provide a "hint" as to a reason why. The assist bits are set based on normal forwarding lookups performed by forwarding engine 208. For example, forwarding engine 208 may set an assist bit for all MAC SA entries associated with mobile (wireless) clients as to indicated that such packets are to be processed by APP engine 210, or an assist bit might be set for all packets arriving on a specific port or VLAN (Virtual Local Area Network) indicating that such packets are to be processed by APP engine 210, or, as will be described in greater detail below, in accordance with present disclosure, forwarding engine 208 might set an assist bit for certain identified protocol packets indicating that such protocol packets are to be processed by APP engine 210.

Packet modification field 256 includes instructions for packet modifier 212 as to how to modify the packet to which forwarding data structure 250 corresponds. According to one embodiment, packet modification field 256 takes the form of a pointer which points to a corresponding set of instructions in table 234 which are to be executed by packet modifier 212.

Packet input classification field 258 includes information that, among other things, indicates the ingress port of the packet, indicates how many bytes the packet contains, indicates the Layer 3 protocol of the packet (e.g., IPv4, IPv6, etc.) and includes a pointer to the start of Layer 3 data, indicates the Layer 4 protocol of the packet (e.g., TCP, UDP, etc.) and includes a pointer to the start of Layer 4 data, and indicates a priority assigned to the packet which controls how the packet is processed relative to other packets arriving at switch 200.

Packet output classification fields 260 include information which, among other things, indicates an output priority which should be assigned the packet, and indicates how QoS fields of the packet should be modified (e.g., Layer 2 QoS and Layer 3 DSCP (Differentiated Services Code Point)).

Among the various other fields 262, copy/copy queue field 264 includes a vector of bits (e.g., 4 bits) that represent different copy locations (e.g., 4 different copy locations) which represent different CPUs (such as internal and external CPUs 224 and 228, for example), and copy queue for each location which indicates a priority of the packet when it reaches the indicated CPU (copy location). Based on the information in copy/copy queue field 264, packet modifier 212 will make additional copies of the packet and send it to a port as determined by configuration in packet modifier 212. For example, suppose a scenario where a given packet is to be sent to port $P_{F3}$ of frontplane ports 218, and that forwarding engine 208 (or APP engine 210) determines that the packet is of a type (e.g., a protocol packet) that is also to be sent to the slave CPU, such as one of the internal or external CPU(s) 224, 228. In such case, forwarding engine 208 (or APP engine 210) would set the copy bit of copy/copy queue field 264 of forwarding data structure 250 corresponding to the slave CPU, and packet modifier 212 would send the packet in the normal fashion across switch fabric 204 to port $P_{F3}$, and would also send the packet to the port associated with the slave CPU. If the slave CPU is an internal CPU 224 on blade 202 attached to port $P_{C1}$, packet modifier 212 would send the packet to the internal slave CPU 224 via switch fabric 204 to port $P_{C1}$.

Drop field 266, if set, instructs packet modifier 212 not to send the packet to its primary destination, as determined by the normal forwarding decision of forwarding engine 208, but packet modifier 212 can still copy to copy locations if so indicated by copy/copy queue field 264.

Figure 4:
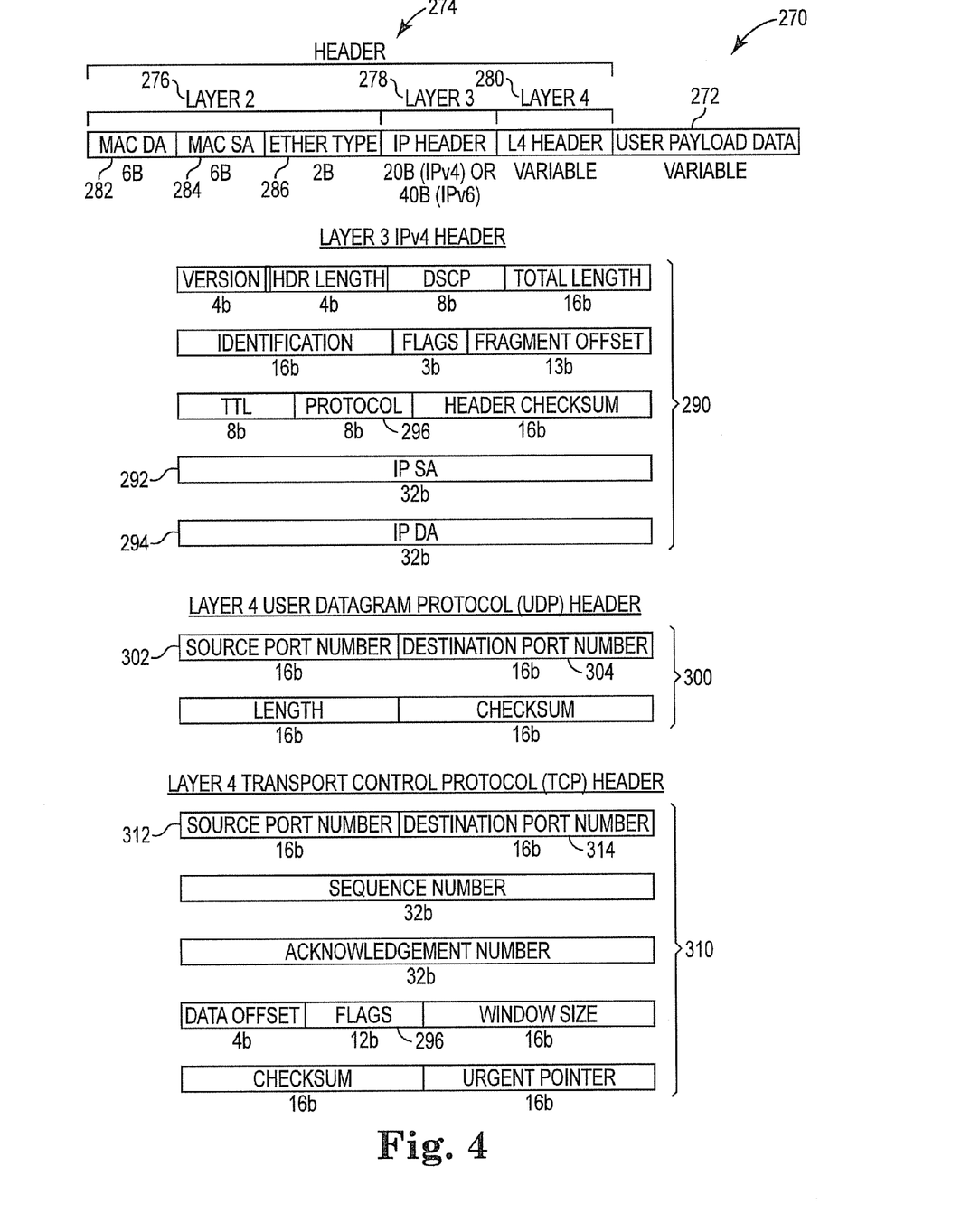
FIG. 4 is a block diagram illustrating an example of a data packet format in accordance with embodiments of the present disclosure.

FIG. 4 illustrates an example of a standard packet format 270, such as that of packet P1. Packet format 270 includes a user payload data component 272, and a header component 274, with header component 274 including a Layer 2 header 276, a Layer 3 header 278, and a Layer 4 header 280, with examples of each being illustrated in greater detail in FIG. 3. As known by those of ordinary skill in the art, Layers 2, 3, and 4 refer to logical layers of the Open Systems Interconnection (OSI) 7-layer model which is a standard for network communications. It is noted that FIG. 4 represents only one example of a packet format, and that any number of other packet formats may be employed. For example, other packet formats may employ different header types and formats. Thus, while the example of FIG. 4 illustrates headers associated with Ethernet technology and IP-networking, other forms of headers are also possible (e.g., 802.11 wireless layer 2 headers, token ring, etc.).

As illustrated by FIG. 4, Layer 2 header 276 includes a MAC (DA) field 282, a MAC SA field 284, and Ether Type field 286. As an example, Layer 3 header 278 may be an IPv4 L3 header, as illustrated at 290, which includes, among other fields, an IP SA field 292, an IP DA field 294, and a protocol field 296. The IP SA and IP DA fields 292, 294 logically indicate where the packet came from and where the packet is being sent. Protocol field 296 indicates what Layer 4 header 280 is being carried by the packet (i.e., the L4 header 280 is TCP if IP protocol field 296 is 6, and is UDP if the IP protocol field 296 is 17, etc.).

An example of a Layer 4 UDP header is illustrated at 300 and includes, among other fields, a source port number field 302 and a destination number port field 304, which indicate the service that is being used by the packet (e.g., port 80 is HTTP (Hypertext Transfer Protocol) for web access, port 25 is SMTP (Simple Mail Transfer Protocol) for connecting to mail servers, port 143 is IMAP (Internet Message Application Protocol) for a connecting to mail servers in a different manner, etc.

An example of a Layer 4 TCP header is illustrated at 310 and includes, among other fields, a source port number field 312 and a destination port field 314. As described above with respect to UDP header 300, source port and destination port number fields 312, 314 indicate the service being used by the packet.

The operation of switch 200, according to embodiments of the present disclosure, is illustrated below with reference to FIGS. 2 through 6, with FIG. 5 generally illustrating a packet flow through switch 200 according to one embodiment. It is noted that while the operation of identifying packets to be distributed between forwarding hardware components 213 of switch 200, and the function of generating modified packets in response to such identified packets is described primarily with reference to blade 202₁, such description and operation applies to any of the blades 202₁ through 202_N. Similarly, while the operation of such modified packets being received and acted upon by blades 202 of switch 200 is described primarily with reference to blade 202_N, such description and operation applies to all blades 202₁ through 202_N.

With reference to FIG. 2, when a packet P1 enters switch 200, such as via a frontplane port 218 of blade 202₁, packet P1 is first stored in packet memory 206 and then transmitted to forwarding engine 208. Upon receiving packet P1, forwarding engine 208 processes packet P1 in order to determine how to forward packet P1 based on information in header 274 and in programmable tables 230. With reference to the packet flow illustration of FIG. 5, the packet P1 comprises the original packet 330 which includes a user payload data component and a header component, such as illustrated at 272 and 274 of standard packet format 270 in FIG. 4. Based on such processing, forwarding engine 208 generates a forwarding data structure information as to how and where the packet should be forwarded as well as to how the packet should be modified, such as illustrated by forwarding data structure 250 of FIG. 3.

Additionally, in accordance with embodiments of the present disclosure, the forwarding engine 208 further determines whether packet P1 is one of a group of packets that might belong to a predetermined class of data packets to be distributed with low-latency to all blades 202₁ to 202_N of switch 200. As described above, such class of data packets may include any messages or packets that should be distributed in a timely fashion to all data forwarding element or blades 202 of switch 200 in order to maintain proper operation of a network to which switch 200 forms a part, such as network 100 of FIG. 1, for example, With respect to differentiating and identifying packets, it is noted that different types of packets can be identified and distinguished from one another based at least on information contained in the header component of the packet, such as header component 274 of the standard packet format 270 of FIG. 4. Different types of packets may have different information or data at one or more bit positions within one or more data fields of one or more of the different layer headers (e.g., Layer 2 header 276, Layer 3 header 278, and Layer 4 header 280 of FIG. 4). As such, the information/data in one or more fields of one more or more of the layer headers of a packet header can represent data or bit patterns that can identify different types of packets.

According to one embodiment, based on such information, one or more of the programmable tables 230 associated with forwarding engine 208, such as an ACL table, for example, include a plurality of packet identification entries, one for each packet of the predetermined class of packets, with each packet identification entry representing a data or bit pattern of one or more fields from one or more headers of a packet header (such header component 274 of standard packet format 270 of FIG. 4) that corresponds to a different one of the packet types of the predetermined class of packets.

In operation, forwarding engine 208 compares the packet identification entries stored in programmable tables 230 to the corresponding fields of the corresponding headers of incoming packets, such as packet P1. If there is a match, forwarding engine 208 determines that packet P1 is part of a group that might belong to the predetermined class of packets and flags the packet to be additionally reviewed by APP engine 210. For example, as described below, forwarding engine 208 might identify the packet as being a protocol packet and flags the packet for additional review by APP engine 210 to determine whether the protocol packet is of a particular type that should be processed in an expedited fashion (i.e., not all protocol packets are of a type that should be processed in an expedited fashion). According to one embodiment, forwarding engine 208 flags the packet by setting a bit in one of the fields of the forwarding data structure, such as one of the assist bits (e.g., the least significant bit) in the assist bits field 254 of forwarding data structure 250 as illustrated by FIG. 3.

If a match is not found, forwarding engine 208 determines that the packet does not belong to the predetermined class of data packets, and forwarding engine 208 decides that the packet is not to be additionally processing by APP engine 210 and, thus, does not set the bit in the forwarding data structure (i.e., does not flag the packet).

As a concrete example of the operation of forwarding engine 208, consider the scenario described above where incoming packet P1 is a PIM protocol packet that could be of a type that should be distributed in a low-latency fashion to all blades $202_1$ to $202_N$, such as a PIM DF winner packet. It is known that PIM protocol packets have a particular IP DA which, in the case of IPv4, is 223.0.0.13, which is called the PIM routers address, and have a particular IP Protocol Field entry of "103" which indicates a PIM packet. It is also know that in the PIM header, a PIM Version field will have a value of 2 and that a value of 2 in the PIM Type field is indicative of a "winner message". Based on this information, according to one embodiment, as described above, one of the packet identification entries constructed in one of the programmable tables 230 associated with forwarding engine 208, such as an ACL table, has values or a bit pattern which matches selected information of the header component 274 of the packet P1 which is indicative of the packet being a PIM packet and, in this case, a PIM winner packet.

In this scenario, in addition to making normal forwarding and data modification decisions with respect to packet P1, forwarding engine 208 compares the packet identification entries programmed in tables 230 and, in this example, determines that there is indeed a match between this ACL table entry and the values of the various corresponding fields of the header 274 of packet P1. Accordingly, in this example, forwarding engine 208 identifies packet P1 as being one of a group of packets (in this case, a PIM DF winner packet) that potentially belongs to the predetermined class of packets (e.g., those that should be delivered in a expedited fashion to blades $202_1$ to $202_N$) and provides indication of such within the forwarding data structure, such as by setting a bit within the assist bits field 254 as described above.

Other protocol types and packets can be similarly identified by forwarding engine 208 to be additionally processed by APP engine 210, such as RIP (Routing Information Protocol), which is a protocol used to control unicast routing. RIP uses protocol packets sent over IP and UDP having an IP Protocol Field entry of "17" (indicating UDP) and a UDP Destination Port Number of "520" (see FIG. 4).

Figure 5:
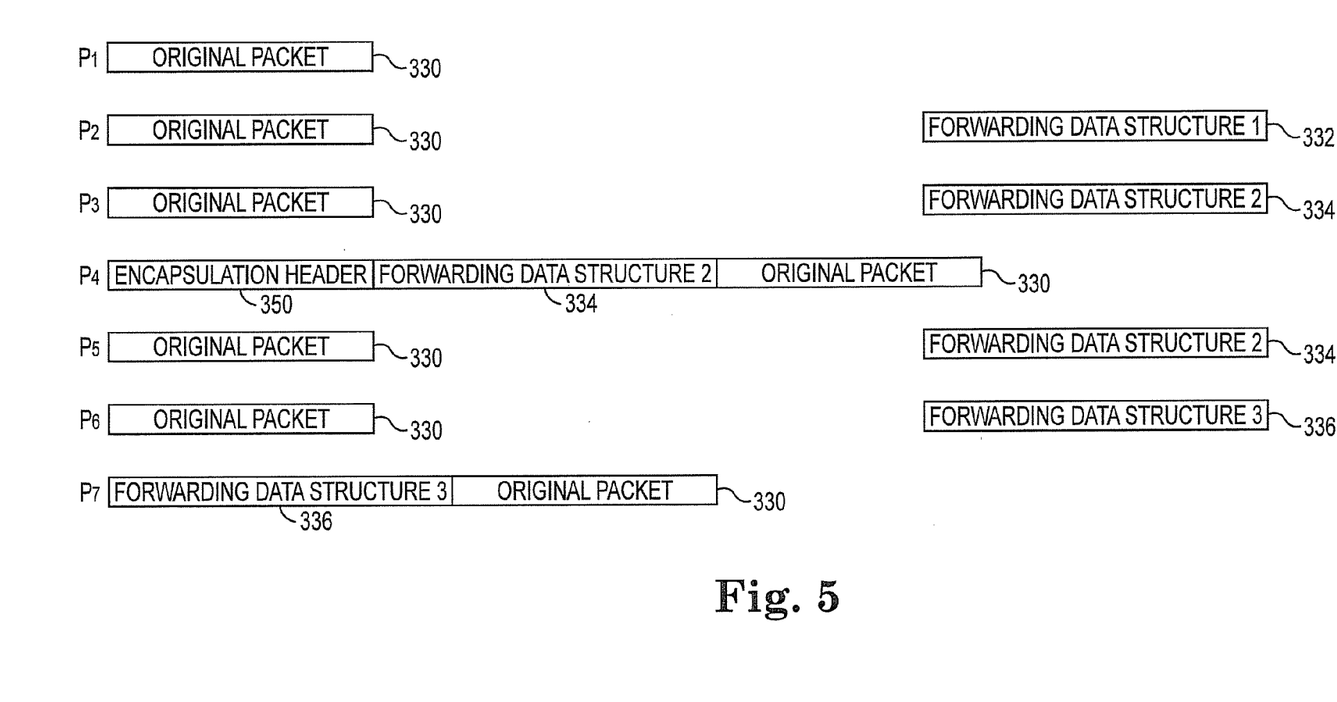
FIG. 5 is a block diagram illustrating a packet flow through the switch of FIG. 2 according to one embodiment of the present disclosure.

With reference to FIG. 2 and to the packet flow illustration of FIG. 5, packet P2 represents the output from forwarding engine 208 after processing packet P1. As illustrated in FIG. 5, packet P2 includes the original packet 330 of packet P1 along with corresponding forwarding data structure 1, as respectively indicated at 330 and 332. According to one embodiment, as illustrated, the original packet 330 of packet P1 and forwarding data structure 1, 332, are not physically joined and are stored at separate locations, but are logically linked to one another.

If forwarding engine 208 has identified packet P1 as not being one of the group of packets to be additionally processed by APP engine 210 (e.g., no assist bit has been set in assist bits field 254 of forwarding data structure 250), packet P2 bypasses APP engine 210 and goes to packet modifier 212 as part of a normal packet forwarding process.

However, if forwarding engine 208 has set an assist bit in assist bits field 254 of forwarding data structure version 1, indicated at 332 in FIG. 5, APP engine 210 receives and performs additional processing on packet P2 and Forwarding Data Structure 332. According to one embodiment, in a fashion similar to the one described above with respect to forwarding engine 208, APP engine 210, based on data in packet P2 and on instructions and information stored in programmable tables 232, performs functions to determine whether packet P2, as flagged by forwarding engine 208, is one of the predetermined class of packets.

As an example, continuing with the above described scenario where packet P1 is a PIM DF winner packet, according to one embodiment, APP engine 210 extracts data from a field of forwarding data structure 1, 332, which indicates the ingress VLAN of packet P1, and extracts a Rendezvous Point (RP) address from the PIM header of packet P1. APP engine 210 performs a look-up in associated programmable tables 232 using the ingress VLAN and RP address information to determine whether a bit is set indicating whether switch 200 is the current DF for this interface and RP address. If the bit is set, APP engine 210 determines that another network device (e.g., a switch) is about to take over the DF duties of switch 200 and that packet P1 belongs to the predetermined class of packets that should be processed in an expedited fashion by all blades $201_1$ to $201_N$ of switch 200. If the bit is not set, APP engine 210 determines that packet P1 is not of the predetermined class of packets and the packet is passed to packet modifier 212 for normal processing based on forwarding data structure 1, 332.

According to another embodiment, APP engine 210 employs one or more algorithms to analyze and compare selected data from the original packet 330 and from forwarding data structure 1, 332, with data stored in programmable tables to determine whether the packet is one of the predetermined class of data packets.

As described above, forwarding engine 208 provides a screening function to quickly identify which incoming packets might belong to the predetermined class of packets (e.g., broadly identifies packets which might belong to the predetermined class of packets, such as protocol packets), while APP engine 210 provides a more in-depth determination. This enables only those incoming packets that might belong to the predetermined class of packets to be further analyzed by APP engine 210 and quickly bypasses other packets to packet modifier 212. Since, according to one embodiment, APP engine 210 has more programming capabilities than forwarding engine 208, APP engine 210 is more flexible and can be adapted to perform more detailed analysis of data packets that might belong to the predetermined class of packets (e.g., which can change over time) than forwarding engine 208.

As described above, if APP engine 210, based on packet P2, determines that original packet P1 330 does not belong to the predetermined class of packets, APP engine does not perform any additional processing and passes packet P2 to packet modifier 212 to be forwarded as part of the normal packet forwarding process based on forwarding data structure 1, 332.

However, if APP engine 210, based on packet P2, determines that that original packet P1 330 does, in fact, belong to the predetermined class of packets, APP engine performs additional processing (based on instructions and information in programmable tables 232, as described above) to modify forwarding data structure 1, 332, to form forwarding data structure 2, 334, and provide packet P3 which includes original packet P1, 330, and forwarding data structure 2, 334, as illustrated by FIG. 5.

According to one embodiment, APP engine 210 modifies forwarding data structure, 1, 332, to form forwarding data structure 2, 234. According to one embodiment, APP engine 210 modifies data to enable the packet to be sent to one loopback port 220 on each of blades $202_1$ to $202_N$, and modifies packet modification field 256 to instruct packet modifier 212 to extend the packet (i.e., attach or forward the forwarding data structure 250 with the packet) and to encapsulate the packet (e.g., pre-pend the packet with an encapsulation header 350, as will be illustrated in greater detail below, see FIG. 6). According to one embodiment, APP engine 210 also modifies Forwarding Data Structure 334 to ensure that the packet sent to switch fabric by packet modifier 212 is delivered to the APP engine 210 on all blades $202_1$ to $202_N$, modifies data to provide "hints" to indicate to the APP engines 210 of all blades $201_1$ to $201_N$ why they have received the packet (e.g., by setting one or more selected assist bits in assist bits field 254), and modifies Packet Output Classification field 260 so that the packet is given a high priority so as to be quickly processed upon receipt by all blades $201_1$ to $201_N$.

Packet modifier 212, upon receipt of packet P3 from APP engine 210 and based on the instructions in forwarding data structure 2, 334, generates packet P4. Packet P4 includes the original packet 330 of packet P1, forwarding data structure 2, 334, and an encapsulation header 350 pre-pended thereto (which will be described in greater detail below). According to one embodiment, instructions to packet modifier 212 in forwarding data structure 2, 334, as provided by APP engine 210 are "pointers" which point to different sets of instructions in programmable tables 234 that are carried out by packet modifier 212 to modify packet P3 in order to form packet P4.

Figure 6:
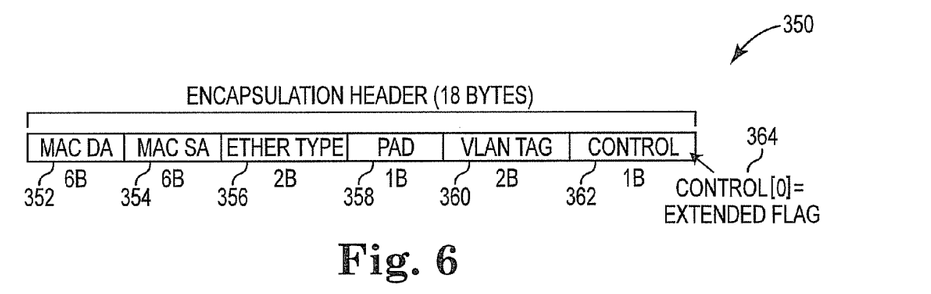
FIG. 6 is a block diagram illustrating an example of an encapsulation header in accordance with one embodiment of the present disclosure.

FIG. 6 illustrates one embodiment of encapsulation header 350 which is pre-pended to packet P3 in the formation of packet P4 by packet modifier 212. Encapsulation header 350 includes a MAC DA field 352, a MAC SA field 354, an Ether type field 356, a Pad field 358, a VLAN Tag field 360, and a control field 362. Control field 362, among other things, includes a bit, such as the least significant bit of the field, which, when set, indicates that the packet includes a forwarding data structure. According to one embodiment, switch 200 is configured such that the first bytes of any packet arriving on any port are that of a MAC DA (i.e., the packet "looks like" an Ethernet packet). As such, once a forwarding data structure is added to a packet (e.g., forwarding data structure 2, 334 being pre-pended to a packet), an encapsulation header (e.g., encapsulation header 350) is additionally pre-pended thereto in order for a packet (e.g., packet P4) to be able to sent to any port on any blade $202_1$ to $202_N$. However, it is noted that other embodiments of a network device including multiple forwarding elements, such as switch 200, can be configured such that packets without encapsulation headers can be received by ports.

Returning to FIG. 2, packet modifier 210 sends packet P4 through high-speed logic link 214 to switch fabric 204 via fabric links 236 to all blades $202_1$ to $202_N$ of switch 200 (including the blade from which packet P4 originated, in this case, blade $202_1$). In FIG. 2, the routing of packet P4 (and packets P5-P7 thereafter) is illustrated with reference only to blade 202N, but is identical for all blades $202_1$ through $202_N$.

Fabric receiver 216 of blade 202N receives packet P4 from switch fabric 204 via high-speed link logic 214 and fabric links 236, and sends packet P4 (based on information in forwarding data structure 250) to the buffer in packet memory 206 corresponding to one of the loopback ports 220 which, in-turn, send packet P4 to a buffer in packet memory 206. Packet memory 206 in turn sends packet P4 to forwarding engine 208.

It is noted that loopback ports 220 are employed by switch 200 of FIG. 2 to get packet P4 to a buffer of packet memory 206 associated with forwarding engine 208 and then on to APP engine 210, since APP engine 210 is not physically connected to any ports of packet memory 206. Such loopback may not be necessary to achieve the transfer of packets between forwarding hardware components of blades in other multi-blade switch configuration, as is the case when sending packets between forwarding hardware components 213 of blades 202 of switch 200 according to the embodiment of FIG. 2.

Upon receipt of packet P4, forwarding engine 208, based on the presence of encapsulation header 350 and that the control bit 364 in the control bit field 362 has been set, recognizes that no modifications are to be made to forwarding data structure 2, 334 and that the packet is to be sent to APP engine 210. Forwarding engine 208 then removes encapsulation header 350 to generate packet P5 which, with reference to FIG. 5, comprises the original packet 330 and forwarding data structure 2, 334, decoupled there from (i.e., forwarding data structure 2 is stored at a different location). Since one or more APP engine "hint flag" bits of assist bits field 254 of the forwarding data structure 2, 334 of packet P5 will already have been set as a result of the initial processing of packet P1 by forwarding engine 208 and APP engine 210 of blade $202_1$ (as described above), packet P5 will be received by APP engine 210.

Upon receiving packet P5, forwarding engine 208 of blade $202_N$, based on APP assist bits set in forwarding data structure 2, 334 is instructed to send the packet to the slave CPU of the blade (i.e., one of the internal or external CPU(s) 224, 228 of blade $202_N$). To achieve this, according to one embodiment, APP engine 210 modifies forwarding data structure 2, 334 to create forwarding data 3, 336 by setting a bit of the vector of bits of the copy/copy queue field 264 corresponding to the local slave CPU (i.e., instructs the packet to be sent to the slave CPU), and by setting the drop field 266 (i.e., instructs that that packet not be sent to any network ports). APP engine 210 then sends out packet P6 which, with reference to FIG. 5, includes original packet 330 and forwarding data structure 3, 336 logically linked thereto.

Upon receipt of packet P6, packet modifier 212 generates packet P7, which includes forwarding data structure 3, 336 pre-pended to the original packet P1, as illustrated by FIG. 5. Packet modifier 212 of blade $202_N$ sends packet P7 through high-speed logic link logic 214 to switch fabric 204 via fabric links 236, where it then returns to high-speed link logic 214 and to fabric receiver 216. Fabric receiver 216, in-turn, sends packet P7 to a buffer of packet memory 206 corresponding to the local slave CPU, such as internal ports 222 and external ports 226. Packet memory 206 then sends packet P7 to the local slave CPU, which then performs the functions dictated by packet P7, such as updating tables 230, 232, 234, for example, or any other task to be performed in order to update the blade to conform to updated network requirements.

According to the above described process, only the local slave CPU (e.g., one of the internal or external CPU(s) 224, 228) of each blade $202_1$ to $202_N$ is involved in the process of updating operating information within each blade based on information in the received data packet identified as belong to the predetermined class of data packets, as compared to conventional techniques where three (3) CPUs can be involved in such a process.

According to other embodiments, switch 200 can be configured such that a packet does not need to be sent to the local slave CPU of each blade $202_1$ to $202_N$ in order to provide updates to each blade. For example, according to one embodiment, APP engine 210 is configured with the capability to modify data in programmable tables 230, 232, and 234 (among others). In such case, the above described process is the same, except that packet APP engine 210 would process packet P5 itself and make necessary table modifications so that packets P6 and P7 would never be created and the forwarding and processing associated with packets P6 and P7 would not be performed. According to such a scenario, no CPUs are involved in the process of forwarding the packets identified as belonging to the predetermined class of packets between forwarding hardware components 213 of each blade. $202_1$ to $202_N$ of switch 200.

By reducing or eliminating the involvement of CPUs in identifying and distributing packets belonging to a class of predetermined packets to all blades $202_1$ to $202_N$, such as protocol packets vital to proper network operation, switch 200 reduces latencies introduced by the software involvement of the CPUs and more quickly distributes such packets to all blades $202_1$ to $202_N$. Specifically, a master CPU is removed from the latency-sensitive path of such packets, which is a bottleneck as it manages all N blades of switch 200. In other embodiments, the local slave CPU of each blade is also removed so that there is no CPU involvement whatsoever in the distribution of such packets. As such, in some embodiments, such packets are processed at hardware speed with no CPU involvement. Additionally, since forwarding engine 208, APP engine 210, and packet modifier 212 of forwarding hardware component 213 are programmable, in particular, APP engine 210, the operation of switch 200 is flexible and can readily accommodate processing modifications and changes in the types of packets which should be processed in an expedited fashion.

Figure 7:
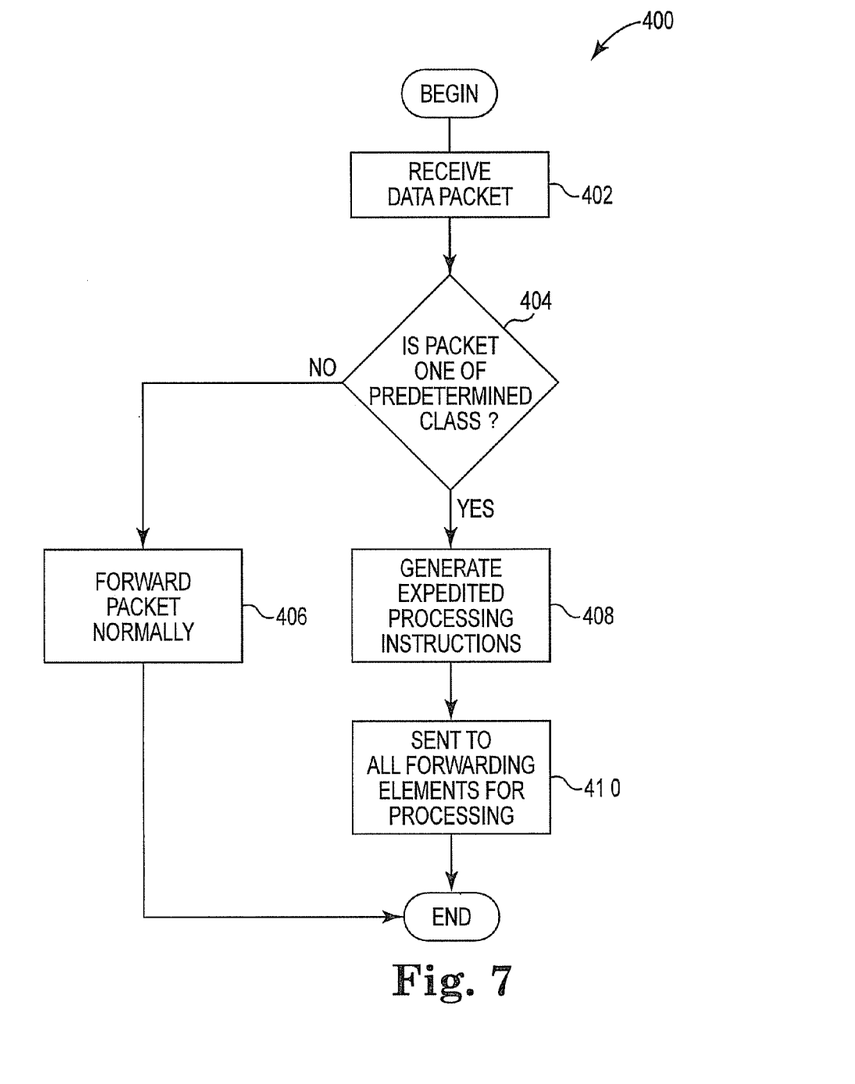
FIG. 7 is a flow diagram describing the operation of a network device according to one embodiment of the present disclosure.

FIG. 7 is a flow diagram describing, according to one embodiment, a method 400 of operating a network device having a plurality of packet forwarding elements, each forwarding element including a forwarding hardware component, such as switch 200 of FIG. 2 including packet forwarding elements 202 (i.e., blades $202_1$ to $202_N$) and forwarding hardware components 213 (i.e., forwarding engine 208, APP engine 210, packet modifier 212). At 402, the forwarding hardware component of one of the plurality of packet forwarding elements receives a data packet from a network, such forwarding engine 208 of blade $202_1$ of switch 200 receiving packet P1, as described above.

At 404, the forwarding hardware component determines whether the received packet is one a group of packets that might be one of a predetermined class of packets (e.g., whether the packet is a protocol packet) based on data in the received packet, such as by comparing selected fields or portions of selected fields of data within the data packet to data stored in programmable tables accessible by the forwarding hardware component. For example, as described above with respect to FIGS. 2-6, forwarding engine 208 of blade $202_1$ compares selected fields from received packet P1 to information stored in programmable tables 230 to determine whether packet P1 might belong to the class of predetermined packets.

With reference to the previously described case of a PIM Bidir protocol message, forwarding engines compare the IP DA, the IP Protocol fields, and other fields within the PIM Header (e.g., PIM version, PIM Type) with information in programmable tables 230. If no match is present, forwarding engine 208 determines that packet P1 is not of the predetermined class of packets and the process proceeds to 406 where the packet is processed according to normal procedures (e.g., creates a forwarding data structure for normal packet forwarding). If a match occurs, forwarding engine 208 determines that packet P1 belongs to a group of packets that might need expedited forwarding (in this case, a protocol packet) and generates forwarding data structure 250 with one or more "flag" or "hint" bits in the assist bits fields 254 set so that a more in-depth determination of whether packet P1 belongs to the predetermined class of data packets (e.g., a subgroup of protocol messages that should be distributed in a timely fashion to all blades $201_1$ to $201_N$) is carried out by APP engine 210.

Based on the setting of the flag(s) or hint bit(s), APP engine 210 of hardware forwarding component 213 receives and carries out a more in-depth analysis of the flagged packet (e.g., packet P2 as previously described, by FIG. 5). In other words, forwarding engine 208, which does not have programming capabilities as extensive as APP engine 210, performs a pre-screening function to flag packets that might belong to the predetermined class of data packets ("packets of interest"), and APP engine 210 performs a more thorough determination, as described above, as to whether the received packet P1 is of the predetermined class of data packets.

If APP engine 210 determines that packet P1 is not of the predetermined class of packets, the process proceeds to 406 where the packet is processed according to normal procedures (e.g., the forwarding data structure provided by forwarding engine 208 is employed for normal packet forwarding).

If APP engine 210 determines that packet P1 does indeed belong to the predetermined class of packets, process 400 proceeds to 408. At 408, the forwarding hardware component generates expedited processing instructions corresponding to the received data packet based on data in the received data (e.g., in the header of the data packet). For example, as described earlier above, APP engine 210 modifies the forwarding data structure corresponding to the packet as provided by forwarding engine 208, such as by modifying forwarding data structure 1, 332, to generate forwarding data structure 2, 334 (see FIG. 5). As described above, forwarding data structure 2 acts as a set of expedited processing instructions that enable the packet to be forwarded directly from the forwarding hardware component of the packet forwarding element receiving the packet to the forwarding hardware component of all of the packet forwarding elements of the network device, such as from forwarding hardware component 213 of blade $202_1$ to the forwarding hardware components 213 of all blades $202_1$ to $202_N$ of switch 200.

At 410, the forwarding hardware component of the packet forwarding element which identified the incoming packet as being of the predetermined class of packets and which generated the expedited processing instructions, sends the packet, together with the expedited forwarding instructions, to the forwarding hardware components of all packet forwarding elements of the network device for processing based on the expedited forwarding instructions. For example, as described above, packet modifier 212 of forwarding hardware component 213 of blade $202_1$ joins the data packet (P1) with the expedited forwarding instructions (forwarding data structure 2) to form data packet P4 which is sent to all blades $202_1$ to $202_N$ for processing (e.g., as illustrated by packets P4 through P7 as described above).

Although described above with regard to chassis-type switch 200, the above described process can be applied to any network device having multiple forwarding elements, such as routers and other switch architectures, such as switches connected to form what is referred to as a frontplane stack, as described above with respect to switches 113-2, 113-3, and 113-4. Such "stacked" switches may be geographically separated (e.g., in different buildings of a campus separated by several miles) which could be the case if interconnections 119-1, 119-2, and 119-3 are fiber optic connections. In a stacked configuration, one of the switches is elected to be a "commander", and a CPU on this switch is used to control the overall operation of the stack, similar to a master CPU in a chassis switch configuration, with individual switches of the stack being similar to the blades of the chassis switch configuration. As such, while the switches might be geographically remote from one another, the functionality of how packets belonging to the predetermined class of packets are processed in a stacked switch is the same as that of the chassis configuration of switch 200.

As described herein, various protocols implemented with example network devices permit certain information, such as protocol messages, for example, to be disseminated quickly among the various packet forwarding devices in the network and among the packet forwarding engines within each of the forwarding devices in order to maintain stable network operation.

Additionally, although specific embodiments have been illustrated and described herein, it will be appreciated by those of ordinary skill in the art that a variety of alternate and/or equivalent implementations may be substituted for the specific embodiments shown and described without departing from the scope of the present invention. This application is intended to cover any adaptations or variations of the specific embodiments discussed herein. Therefore, it is intended that this invention be limited only by the claims and the equivalents thereof.

What is claimed is:

1. A network device comprising:
a plurality of packet forwarding elements, each including a hardware component for receiving and forwarding data packets from and to other network devices via a plurality of input ports when connected to a network, each hardware component configured to:
determine whether a received data packet, based on data in the received data packet, is one of a predetermined class of data packets that must be forwarded in an expedited fashion to each packet forwarding element of the plurality of packet forwarding elements of the network device and, if so:
generate expedited processing instructions corresponding to the received data packet based on data in the received data packet, the expedited processing instructions comprising instructions which enable the hardware component to forward the received data packet directly to the hardware component of each packet forwarding element of the plurality of packet forwarding elements with involvement of not more than one central processing unit; and
forward the received data packet together with the corresponding expedited processing instructions as a modified data packet directly to the hardware component of each packet forwarding element of the plurality of packet forwarding elements via a switch fabric for processing of the received data packet by each packet forwarding element using the expedited processing instructions.

2. The network device of claim 1, wherein the predetermined class of data packets comprises data packets to be processed in a low-latency fashion by each of the packet forwarding elements in order to ensure proper operation of the network.

3. The network device of claim 1, wherein the predetermined class of data packets comprises network protocol data packets.

4. The network device of claim 1, wherein processing based on the expedited processing instructions includes updating data stored in programmable tables accessible to the hardware component at each packet forwarding element.

5. The network device of claim 4, wherein processing by the hardware component based on the expedited processing instructions includes submitting the packet to a CPU corresponding to each packet forwarding element which updates the data stored in the programmable tables.

6. The network device of claim 4, wherein the hardware component of each packet forwarding element is configured to update the data stored in the programmable tables.

7. The network device of claim 1, wherein the hardware component is configured to analyze selected data within the received data packet and data stored in the hardware component to determine whether a received data packet is one of the predetermined class of data packets.

8. The network device of claim 1, wherein the network device includes an interface fabric, and wherein the received data packet and expedited processing instructions are forwarded directly to the hardware component of each packet forwarding element of the plurality of packet forwarding elements via the interface fabric.

9. The network device of claim 1, wherein the expedited processing instructions are in the form of a forwarding data structure which is attached to the data packet and forwarded together directly to the hardware component of each packet forwarding element of the plurality of packet forwarding elements.

10. The network device of claim 1, wherein each of the forwarding elements comprises a blade in a network switch having chassis switch architecture.

11. The network device of claim 1, wherein the network device comprises a network switch configured in a stacked architecture wherein one or more of the forwarding elements are network switches which are remote to one another.

12. The network device of claim 1, wherein the forwarding elements are part of a router.

13. The network device of claim 1, wherein the hardware component includes a forwarding engine, an advanced packet processing engine, and a packet modifier.

14. The network device of claim 1, each hardware component to generate expedited processing instructions which enable the hardware component to forward the received data packet directly to the hardware component of each packet forwarding element of the plurality of packet forwarding elements without involvement of any central processing units.

15. A method of operating a network device having a plurality of packet forwarding elements each including a hardware component, the method comprising:
receiving, with the hardware component of one of the plurality of packet forwarding elements, a data packet from a network; and
determining, with the hardware component, whether the received data packet is one of a predetermined class of data packets that requires expedited forwarding to each packet forwarding element of the plurality of packet forwarding elements based on data in the received data packet and, if so:
generating, with the hardware component, expedited processing instructions corresponding to the received data packet based on data in the received data packet, the expedited processing instructions comprising instructions which enable the hardware component to forward the received data packet directly to the hardware component of each packet forwarding element of the plurality of packet forwarding elements with involvement of not more than one central processing unit; and
forwarding the received data packet together with the corresponding expedited processing instructions as a modified data packet directly to the hardware component of each packet forwarding element of the plurality of packet forwarding elements via a switch fabric for processing of the received data packet by each packet forwarding element using the expedited forwarding instructions.

16. The method of claim 15, wherein determining whether the received data packet is one of a predetermined class of data packets includes analyzing data from one or more data fields of the received data packet and stored data values accessible to the hardware component.

17. The method of claim 15, wherein processing based on the expedited forwarding instructions includes updating data in programmable tables at each of the packet forwarding elements of the plurality of packet forwarding elements.

18. The method of claim 17, wherein updating data in programmable tables is performed by the hardware component of each packet forwarding element.

19. The network switch of claim 18, wherein the network switch comprises one of a chassis-type switch, wherein each packet forwarding element comprises a blade, and a network switch having a stack architecture, wherein the forwarding elements comprise network switches which are located remotely to one another on a network.

20. A network switch comprising:
a plurality of packet forwarding elements for receiving and forwarding data packets from and to other network devices via a plurality of ports when connected to a network, each packet forwarding element having a hardware component including:
a forwarding engine configured to generate a forwarding data structure for a received data packet and to flag the received data packet as belonging to a predetermined group of data packets that requires expedited forwarding to each packet forwarding element of the plurality of packet forwarding elements based on selected data from the data packet and data stored in one or more programmable tables;
an advanced processing engine configured to determine, if the data packet is flagged, whether the flagged data packet belongs to a predetermined class of data packets that requires expedited forwarding to each packet forwarding element of the plurality of packet forwarding elements and, if so, to generate a modified forwarding data structure to serve as expedited processing instructions based on selected data from the received data packet and forwarding data structure and data stored in one or more programmable tables, the modified forwarding data structure serving as expedited processing instructions comprising instructions which enable the hardware component to forward the received data packet directly to the hardware component of each packet forwarding element of the plurality of packet forwarding elements with involvement of not more than one central processing unit; and
a packet modifier configured to combine and send the received data packet and modified forwarding data structure as a modified data packet directly to the hardware component of each packet forwarding element of the plurality of packet forwarding elements via a switch fabric for processing using the modified forwarding data structure.

21. The network device of claim 20, wherein processing based on the expedited processing instructions includes updating data stored in forwarding tables and state tables at each packet forwarding element which are accessed by the corresponding hardware component.

* * * * *